US 6,562,093 B2

(12) United States Patent
Oh (10) Patent No.: US 6,562,093 B2
(45) Date of Patent: May 13, 2003

(54) CYCLONE DUST COLLECTING DEVICE FOR A VACUUM CLEANER

(75) Inventor: Jang-keun Oh, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 10/040,168

(22) Filed: Oct. 22, 2001

(65) Prior Publication Data

US 2002/0062632 A1 May 30, 2002

(30) Foreign Application Priority Data

Nov. 27, 2000 (KR) .......................................... 2000-70905

(51) Int. Cl.⁷ ............................... B01D 45/12; A47L 9/16
(52) U.S. Cl. ............................. 55/337; 55/426; 55/429; 55/459.1; 55/DIG. 3; 15/327.1; 15/350; 15/353
(58) Field of Search ............................. 15/353, 327.1, 15/350; 55/418, 426, 429, 459.1, DIG. 3, 337

(56) References Cited

U.S. PATENT DOCUMENTS

| | | | |
|---|---|---|---|
| 3,895,930 A | * 7/1975 | Campolong | ................... 55/394 |
| 4,996,538 A | 2/1991 | Brecy et al. | |
| 6,195,835 B1 | 3/2001 | Song et al. | |

FOREIGN PATENT DOCUMENTS

| | | | |
|---|---|---|---|
| DE | 19945403 | 6/2000 | |
| EP | 1199023 A1 | * 4/2002 | |
| GB | 2344278 | 6/2000 | |
| JP | 03000030 A | * 1/1991 | ................... 15/350 |
| WO | WO0074547 | 12/2000 | |

* cited by examiner

Primary Examiner—Robert A. Hopkins
(74) Attorney, Agent, or Firm—Ladas & Parry (57) ABSTRACT

A cyclone dust collecting device of a vacuum cleaner, which is mounted on a telescopic extension pipe. The cyclone dust collecting device of a vacuum cleaner, includes a cyclone body for generating a swirling flow from air and contaminants drawn thereinto, and a cyclone housing engaged with the cyclone body and for separating the contaminant from the air by guiding the swirling flow. The cyclone housing includes a cyclone housing engaged with the cyclone body, for separating the contaminant by guiding the swirling air flow, a cyclone cover formed in a cylindrical shape and engaged with the cyclone body, one end of which being a slanted end closed by a spiral line, and the other end of which being an open end, and a dust collecting container engaged with a lower portion of the slanted end of the cyclone cover, one end of which substantially being a cylinder having one closed end, and the other end of which being slant to correspond to the slanted end of the cyclone cover. Accordingly, normal cleaning can be performed regardless of position of the vacuum cleaner, and, even when discarding collected contaminant, falling of the contaminants from a grill or the breakage of the grill can be prevented.

19 Claims, 6 Drawing Sheets

CYCLONE DUST COLLECTING DEVICE FOR A VACUUM CLEANER

BACKGROUND OF THE INVENTION

1. Field of the Invention

The present invention relates to a vacuum cleaner, and more particularly to a cyclone dust collecting device, which is mounted on a telescopic extension pipe of a vacuum cleaner, to filter out and collect contaminants of relatively large particles that are drawn into the vacuum cleaner.

2. Description of the Related Art

Generally, a cyclone dust collecting device separates particles from a fluid by using centrifugal force. Due to their simple structure and ability to withstand high-temperature and high-pressure environments, cyclone dust collecting devices have been widely used in the industrial fields for a long time. Further, the cyclone dust collecting device is employed in a vacuum cleaner, to first filter and then collect contaminants of relatively larger particles, such as pieces of tissue, vinyl, hairs, and the like, from the air that is drawn in through a cleaner brush. The cyclone dust collecting device prevents these larger contaminants from being filtered out by a paper filter, which is disposed inside a dust collecting chamber, thereby extending the life of the disposable paper filter.

Figure 1:
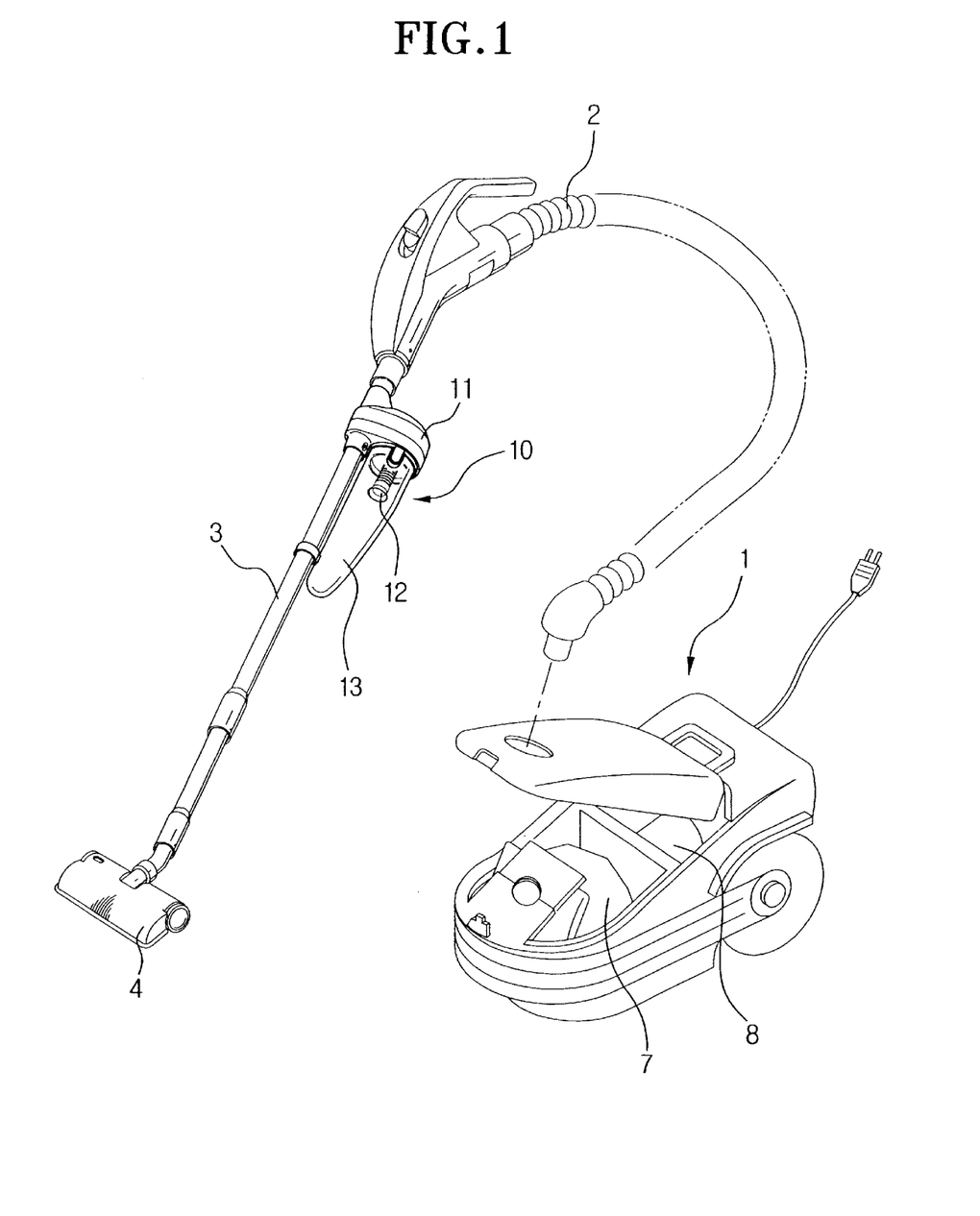
FIG. 1 is a perspective view illustrating a vacuum cleaner having a conventional cyclone dust collecting device.

FIG. 1 is a perspective view showing an example of a vacuum cleaner equipped with a conventional cyclone dust collecting device.

As shown in FIG. 1, the vacuum cleaner with the conventional cyclone dust collecting device 10 includes a cleaner body 1, a brush 4 for drawing in contaminants, a flexible hose 2 and a telescopic extension pipe 3 for connecting the brush 4 to the cleaner body 1, a paper filter 7 for filtering out the contaminants, and a fan motor 8 for generating a suction force. The cyclone dust collecting device 10 is mounted on a connection portion between the telescopic extension pipe 3 and the flexible hose 2 to filter out larger particle contaminants.

The cyclone dust collecting device 10 for the vacuum cleaner draws in air and contaminants through the brush 4 with a suction force generated by the fan motor 8, obliquely into a cyclone housing 13. Various kinds of relatively larger particles of contaminants, such as pieces of tissue, vinyl, hairs, and the like are separated from the air by the centrifugal force, which is caused by a vortex of air. These larger particle contaminants are then collected in the cyclone housing 13. When the clean air reaches the bottom of the cyclone housing 13, it reverses direction and turns into a rising air flow that is expelled to the cleaner body 1 through the flexible hose 2.

During operation of the vacuum cleaner, the orientation of the cyclone dust collecting device 10 may change either intentionally or unintentionally. That is, the cyclone dust collecting device 10 can be tilted or turned upside-down when cleaning higher locations, causing the contaminants collected in the cyclone housing 13 of the cyclone dust collecting device 10, such as tissue, vinyl, hairs, and the like, to fall toward a grill 12 of the cyclone dust collecting device 10. When such reverse flow of contaminants occurs, the contaminants can block the grill 12 of the cyclone dust collecting device 10, thereby decreasing the cleaning efficiency of the vacuum cleaner or disabling its operation. Therefore, blockage of the grill due to a reverse flow of contaminants should be prevented.

Further, since the cyclone housing 13 can be separated from the cyclone body 11 to enable a user to discard the contaminants that have collected in the cyclone housing 13, the grill 12 of the cyclone body 11 will be exposed. The ambient area may get dirty, because of the contaminants that have fallen from the grill. Furthermore, the exposed grill 12 can break if it is mishandled.

SUMMARY OF THE INVENTION

The present invention has been made to solve the problems stated above.

Accordingly, it is an object of the present invention to provide a cyclone dust collecting device for a vacuum cleaner that prevents contaminants from blocking the grill, regardless of the orientation of the cyclone dust collecting device. It is a further object of the invention that the device does not hinder operation of the vacuum cleaner. Yet another object of the invention is to prevent contaminants from falling off the grill of a cyclone body or preventing the grill from being damaged when the collected contaminants are discarded.

The above object is accomplished by a cyclone dust collecting device for a vacuum cleaner according to the present invention, including a cyclone body connected to a telescopic extension pipe of the vacuum cleaner. The cyclone body generates a swirling vortex from an inflow of air and contaminants that have been drawn in. The cyclone dust collecting device further includes a cyclone housing detachably engaged with the cyclone body. The cyclone housing has a spiral partition dividing an interior of the cyclone housing into an upper space for separating contaminants from the air by guiding the vortex of air, and a lower space for receiving the contaminants that have been separated from the air.

The cyclone housing includes a cyclone cover having a cylindrical shape, an open upper end engaged with the cyclone body, and a lower slanted end slanted by a spiral partition. The cyclone housing further includes a dust collecting container detachably engaged with a lower portion of the slanted end of the cyclone cover, for receiving contaminants that have passed through the spiral partition.

An engagement portion extends from the lower slanted end of the cyclone cover. The engagement portion is press-fitted with the upper open end of the dust collecting container.

The spiral partition includes a dome-shaped protrusion formed on a center thereof.

The spiral partition includes first and second ends which may align with each other in a vertical plane or overlap one another in a vertical plane.

A supporting means is provided to elastically support the cyclone housing with respect to the telescopic extension pipe and prevent separation of the cyclone housing from the cyclone body.

The supporting means includes a fixture member mounted to the telescopic extension pipe, an insertion member movably disposed on the fixture member, and inserted in a recess formed on a lower end of the cyclone housing, and an elastic member for biasing the insertion member into engagement with the recess.

The cyclone housing includes a cyclone cover having a cylindrical shape, an open upper end engaged with the cyclone body, and a lower slanted end which is slanted at a predetermined angle with respect to the spiral partition. The cyclone housing further includes a dust collecting container having an open end engaged with the lower portion by a screw. The dust collecting container receives contaminants that have passed through the spiral partition.

The cyclone body further includes a grill defining an air suction path and an air exhaust path. The grill has a plurality of fine holes formed therein, through which air flows.

BRIEF DESCRIPTION OF THE DRAWINGS

The above objects and other features and advantages of the present invention will become more apparent by the following detailed description of a preferred embodiment with reference to the attached drawings, in which.

DETAILED DESCRIPTION OF THE PREFERRED EMBODIMENT

Hereinafter, a preferred embodiment of the present invention will be described in detail with reference to the accompanying drawings, wherein the like reference numerals refer to like elements.

Figure 2:
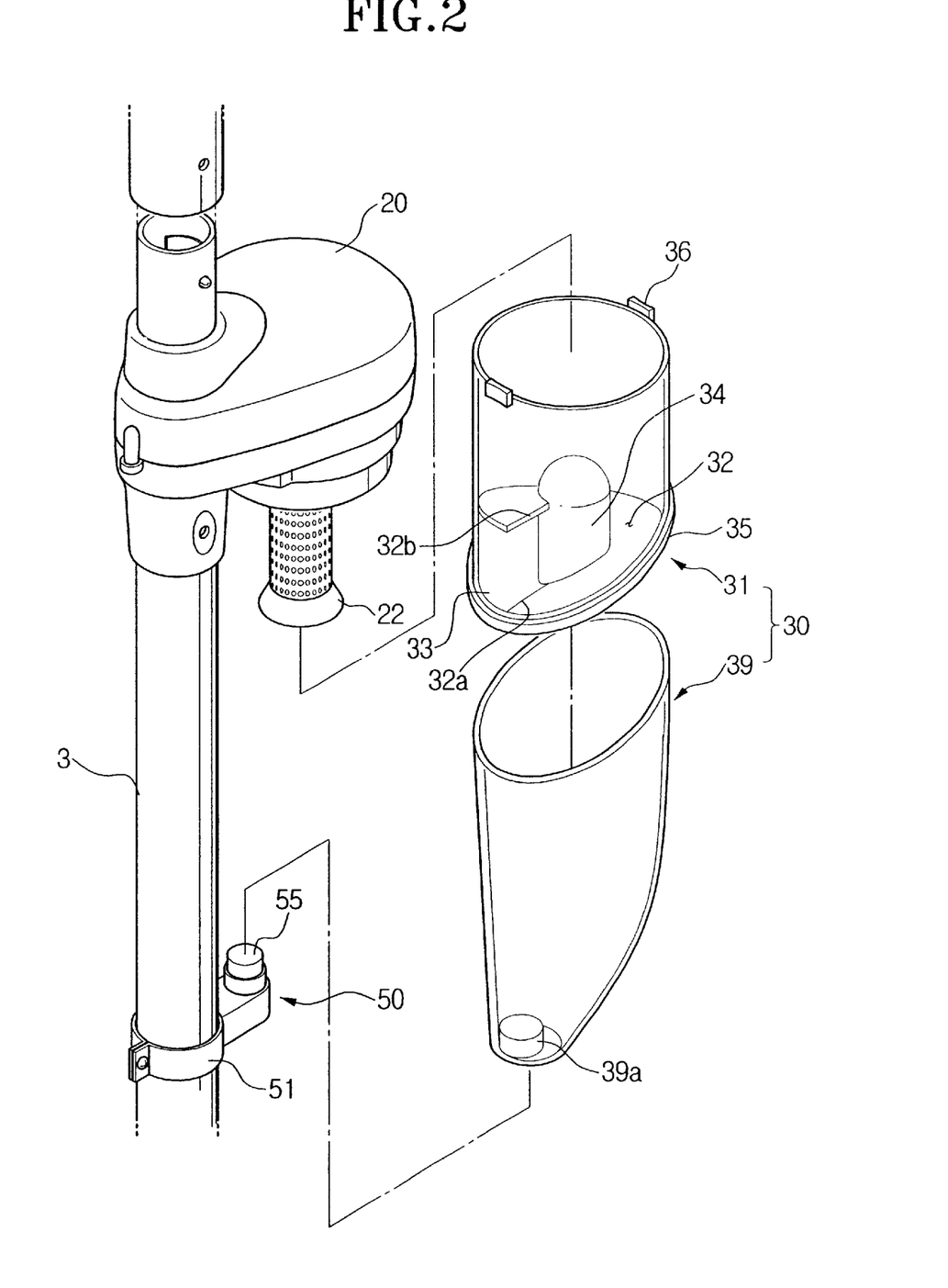
FIG. 2 is an exploded perspective view of a cyclone dust collecting device for a vacuum cleaner according to the present invention.
Figure 3:
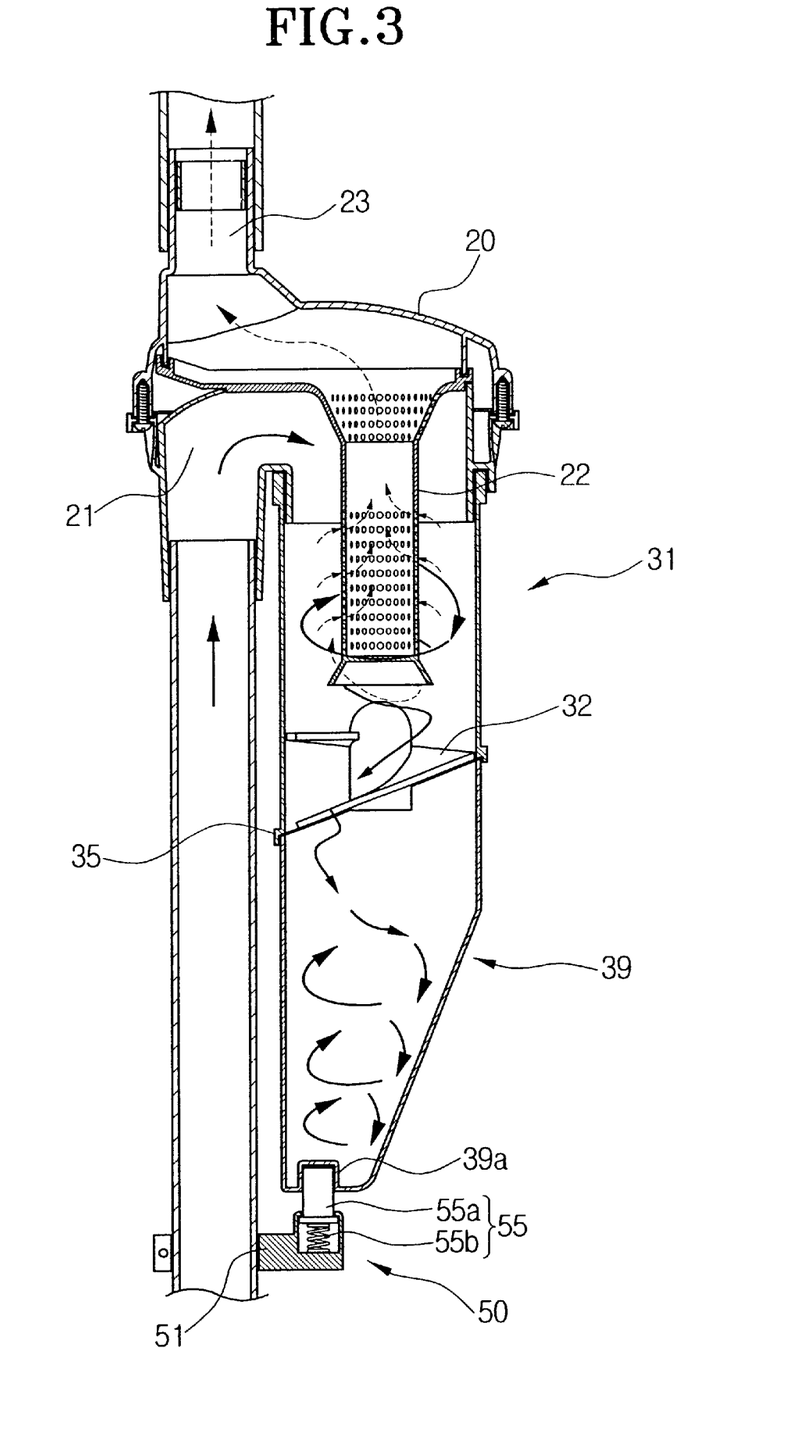
FIG. 3 is a cross-sectional view of the cyclone dust collecting device of FIG. 2.

Referring to FIGS. 2 and 3, a cyclone dust collecting device has a cyclone body 20 and a cyclone housing 30. The cyclone housing 30 includes a cyclone cover 31 and a dust collecting container 39. Here, a support part 50 is provided on the telescopic extension pipe 3 of the vacuum cleaner to support the dust collecting container 39 such that the dust collecting container 39 does not detach from the cyclone cover 31 during a cleaning process.

The cyclone body 20 is connected to the telescopic extension pipe 3 of the vacuum cleaner and includes an inflow air passage 21 for obliquely guiding air and contaminants which are drawn in through the brush 4 (FIG. 1), a grill 22 for filtering the air inside the cyclone cover 31, and an outflow air passage 23 for guiding the air that is drawn in through the grill 22 to a cleaner body 1.

Figure 4:
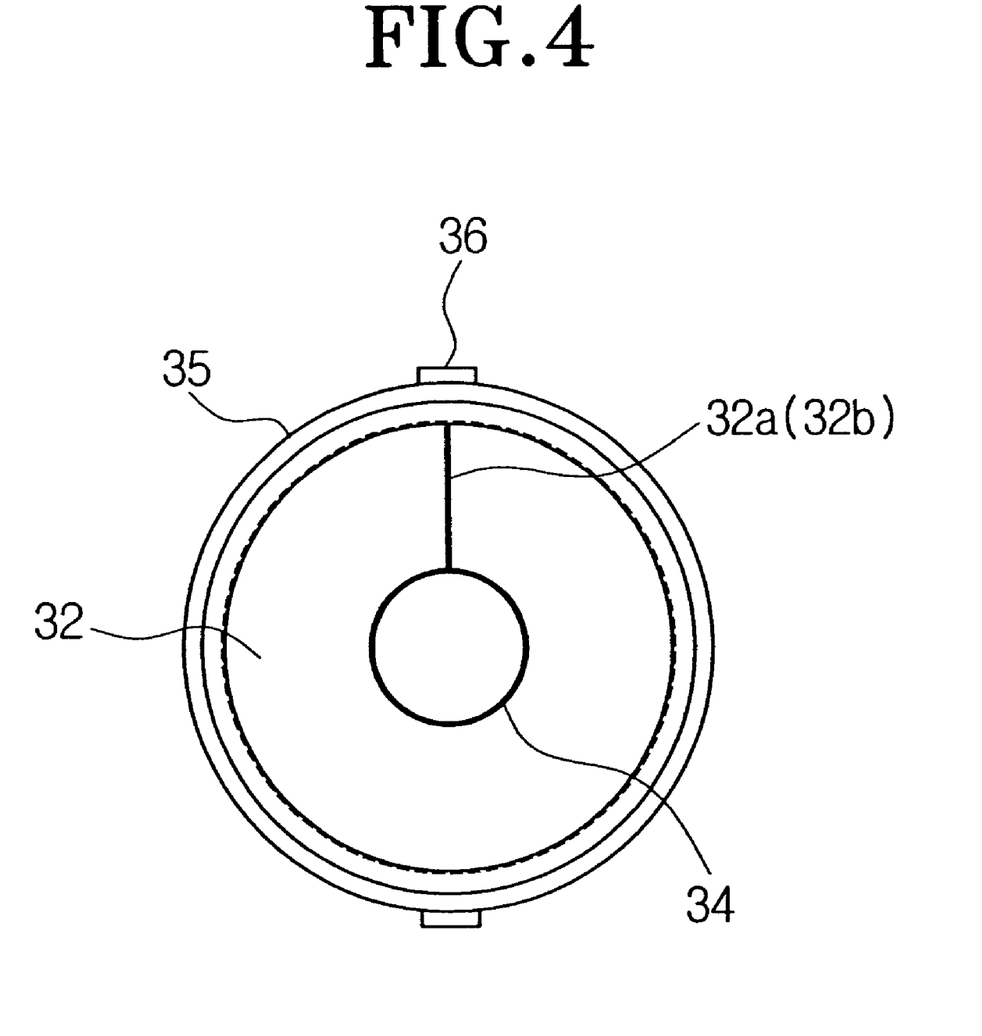
FIG. 4 is a bottom view of a cyclone cover for the cyclone dust collecting device of FIG. 2.
Figure 5A:
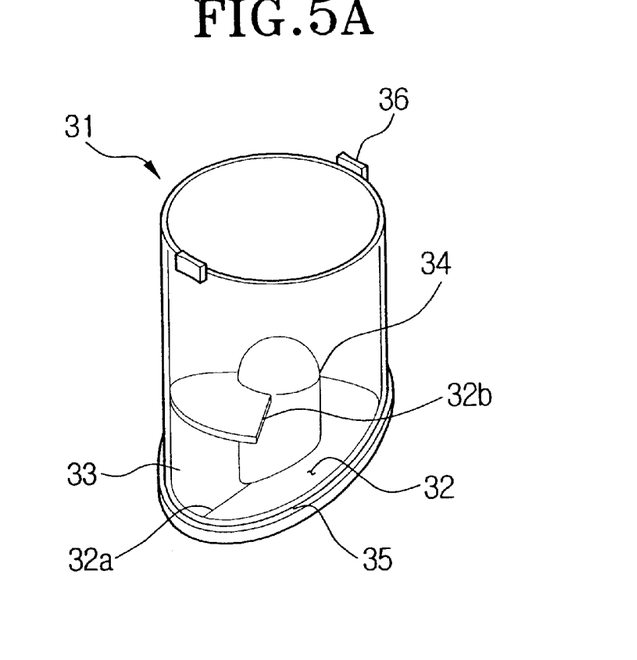
FIG. 5A and FIG. 5B are a perspective view and a bottom view of the cyclone cover, respectively, illustrating the case an overlap in a spiral surface of the cyclone cover of the cyclone dust collecting device.
Figure 5B:
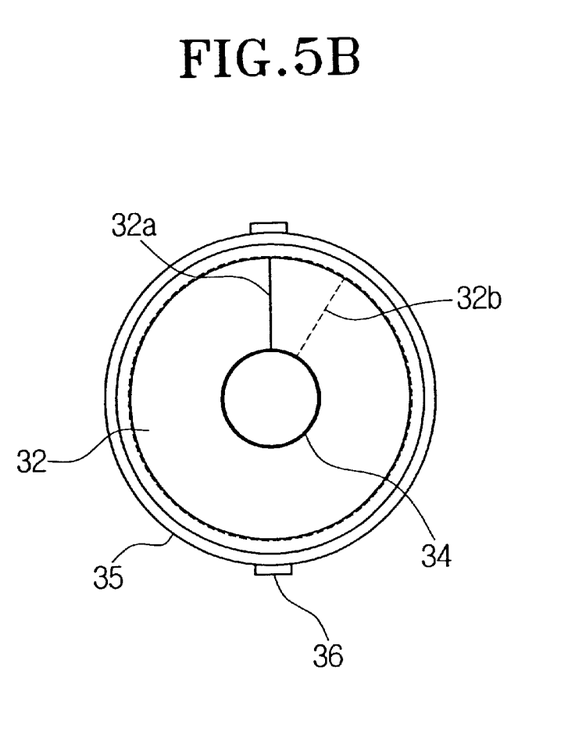

The cyclone cover 31 has a cylindrical shape and is connected to a lower portion of the cyclone body 20. The cylindrical shape of the cyclone cover 31 induces the air that is drawn in from the inflow air passage 21 of the cyclone body 20 into a vortex. One end of the cyclone cover 31 has a plurality of engagement protrusions 36 formed therein for connection with the cyclone body 20. The other end of the cyclone cover 31 is slanted and closed by a spiral surface 32. The spiral surface 32 may be formed in various curves such as a spiral curve, a helical curve, and so on. The slanted end of the cyclone cover 31 is formed by cross-sectioning the cylindrical cyclone cover 31 on the same slant as that of the applied spiral surface 32. Since the spiral surface 32 begins at a point that coincides with the slanted end and extends toward the open end of the cyclone cover 31, a through-hole 33 is defined between the starting point 32a and ending point 32b of the spiral surface 32 to guide contaminants into the dust collecting container 39. The spiral surface 32, as shown in FIGS. 2 and 4, may be formed with the starting point 32a coincident with the ending point 32b or, as shown in FIGS. 5A and 5B, the spiral surface 32 may be formed with the ending point 32b further extended over the starting point 32a, such that a portion of the spiral surface 32 overlaps itself. Accordingly, the size of the through-hole 33 is determined by the angle of the spiral surface 32 and the diameter of the cyclone cover 31. Further, a cylindrical pole 34 having one-third or one-fourth of the diameter of the cyclone cover 31 is provided at the center of the spiral surface 32. It is preferable that the end of the cylindrical pole 34 that faces the open end of the cyclone cover 31 has a dome shape, so that air and contaminants entrained in the air can be guided outside the cyclone cover 31.

Further, an engagement part 35 having a stepped shape is formed around a lower end of the slanted end of the cyclone cover 31. The engagement part 35 secures the cyclone cover 31 to the dust collecting container 39.

The dust collecting container 39 is coupled to the engagement part 35 of the cyclone cover 31. The dust collecting container 39 has a substantially cylindrical shape and a closed lower end. The open end of the dust collecting container 39 is slanted to correspond with the slanted end of the cyclone cover 31, so that the cyclone cover 31 and the dust collecting container 39 are flush and form a straight line when engaged with each other. Further, a recess 39a is formed in the lower portion of the closed end of the dust collecting container 39 to receive the support part 50 for supporting the dust collecting container 39.

Preferably, to reduce the swirling vortex of air from the cyclone cover 31 and also to facilitate a user in mounting the dust collecting container 39 onto the telescopic extension pipe 3, the closed end of the dust collecting container 39 is slightly tapered to have a smaller area than that of the open end, which corresponds to the slanted end of the cyclone cover 31.

The recess 39a formed on the lower portion of the closed end of the dust collecting container 39 has a shape and a size that correspond to an insertion part 55 of the support part 50. The recess 39a receives the insertion part 55 of the support part 50 to secure the dust collecting container 39 to the telescopic extension pipe 3.

The support part 50 further includes a fixture member 51 that is mounted to the telescopic extension pipe 3. A circular clamp of a size corresponding to the outer diameter of the telescopic extension pipe 3 is provided at one end of the fixture member 51 to engage the telescopic extension pipe 3. The insertion part 55 is mounted to the other end of the fixture member 51.

The insertion part 55 includes a pin 55a, which is inserted in the recess 39a of the dust collecting container 39, and a compression coil spring 55b for biasing the pin 55a outward. The pin 55a and the compression coil spring 55b have proper lengths to smoothly separate the dust collecting container 39 from the engagement part 35 of the cyclone cover 31, when a user holds and presses down the dust collecting container 39, and to prevent separation of the dust collecting container 39 from the cyclone cover 31 during a normal cleaning process.

Figure 6:
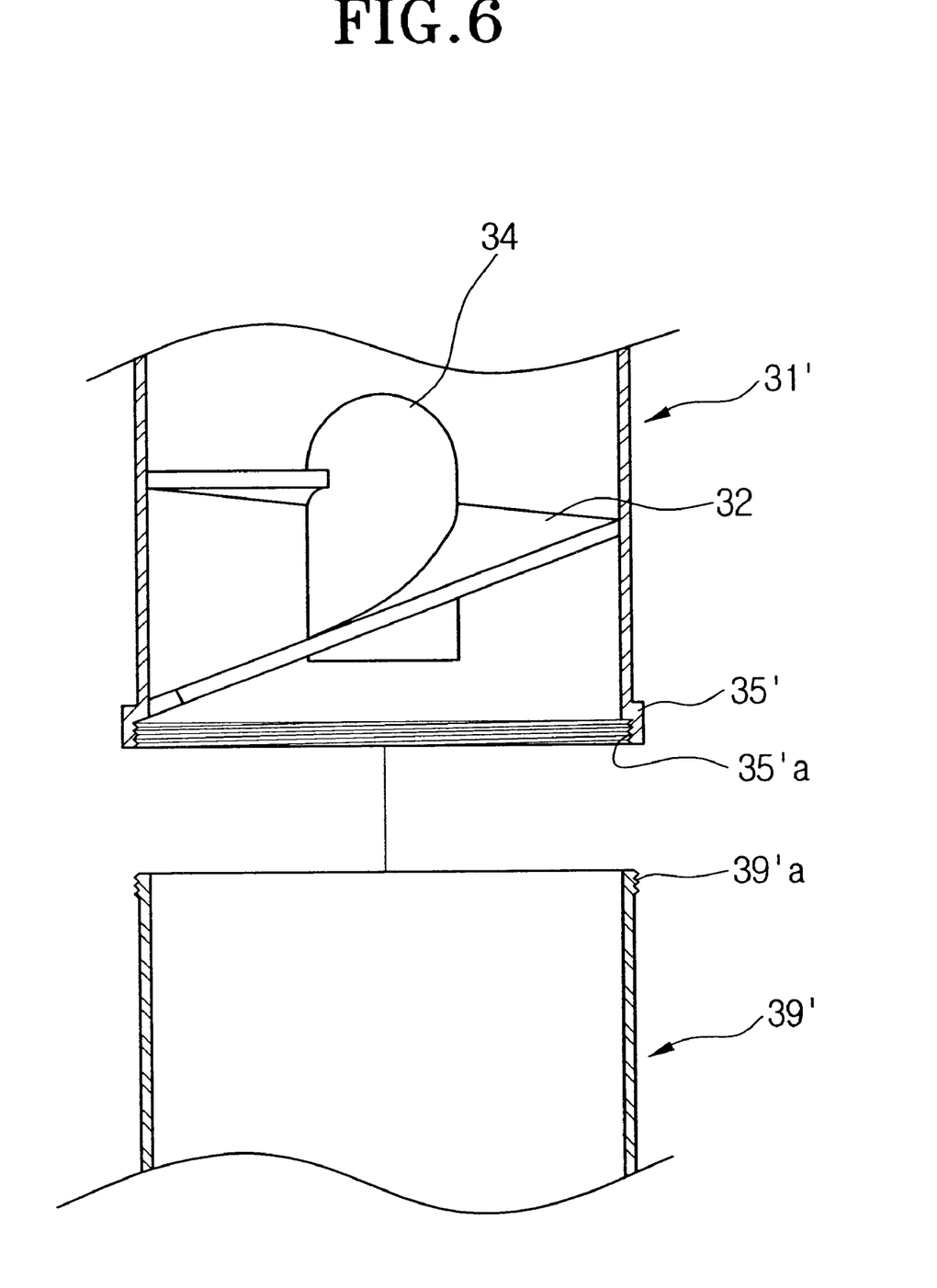
FIG. 6 is a view for showing an alternate, screw-coupled connection between a dust collecting container and the cyclone cover of the cyclone dust collecting device of FIG. 2.

Another example of a manner for engaging the dust collecting container 39 with the cyclone cover 31 is shown in FIG. 6. Referring to FIG. 6, an engagement part 35' of a cyclone cover 31' is not formed along the periphery of the slanted end, but formed along the inner periphery of the lower end of the cyclone cover 31'. The engagement part 35' of the cyclone cover 31' is formed with a female screw 35a', and the outer periphery of the open end of the dust collecting container 39' is formed with a male screw 39b' for engagement with the female screw 35a'. Accordingly, the dust collecting container 39' is connected to the cyclone cover 31' as the engagement part 35' of the cyclone cover 31' is screwed with the dust collecting container 39'. According to this engaging manner, the support part 50 can be omitted.

Hereinafter, the operation of the cyclone-collecting device of the present invention will be described in detail.

Air and contaminants are drawn into the vacuum cleaner through the brush 4 and flow into the cyclone dust collecting device through the inflow air passage 21 of the cyclone body 20. As the air and contaminants enter the cyclone cover 31 they form a swirling vortex of air and contaminants. Larger particle contaminants contained in the air are separated from the air by the centrifugal force and then drop to the bottom of the cyclone cover 31. Most of the air that is free of contaminants collides with the spiral surface 32 of the cyclone cover 31 and reverses direction forming a rising air stream. The rising air stream is expelled to the cleaner body 1 through the grill 22 and the outflow air passage 23. Accordingly, the device is mounted to match the rotation direction of the swirling air flow with the spiral rotation direction.

After the contaminants have been separated from the air by the centrifugal force, the air is dropped but keeps moving along the spiral surface 32 of the cyclone cover 31 in a swirling air flow to be exhausted into the dust collecting container 39 through the through-hole 33. Since the contaminants are blocked by the spiral surface 32 of the slanted cyclone cover 31, the contaminants in the dust collecting container 39 are not discharged through the cyclone cover 31, but are rotated in the swirling air flow within the dust collecting container 39.

The cyclone cover 31 induces the air into a swirling vortex in cooperation with the cyclone body 30, and separates contaminants from the air using centrifugal force. The through-hole 33 formed by the spiral surface 32 guides the separated contaminants into the dust collecting container 39. The dust collecting container 39 serves as a receptacle where the separated contaminants are collected. That is, since a separation part for separating contaminants from the air is separated from a dust collecting part for collecting the contaminants separated from the sucked air, the contaminants separated by the centrifugal force do not flow in a reverse direction toward the grill 22 of the cyclone body 20 and, therefore, cannot block the grill 22.

Next, a method for emptying the dust collecting container 39, which is filled with the contaminants, will be described. A user holds the dust collecting container 39 and presses down on the lower portion of the dust collecting container 39, which is removably mounted on the support part 50, to compress the compression coil spring 55b. This also disengages the engagement part 35 of the dust collecting container 39 from the cyclone cover 31. The user can then remove the dust collecting container 39 from the support part 50. After emptying the dust collecting container 39, the user inserts the insertion pin 55a of the support part 50 into the recess 39a provided in the lower portion of the dust collecting container 39. Then the user presses down on the dust collecting container 39 to compress the coil spring 55b and fit the upper portion of the dust collecting container 39 into alignment with the engagement part 35 of the cyclone cover 3l. When the user releases the dust collecting container 39, the coil spring 55b will expand, urging the dust collecting container 39 into engagement with the engagement part 35 of the cyclone cover 31. Thus, the dust collecting container 39 is supported at one end by the engagement part 35 and at the other end by the support part 50.

Further, in case of a screw-engagement structure, such as that illustrated in FIG. 6, rotation of the dust collecting container 39' counterclockwise separates the dust collecting container 39' from the engagement part 35' of the cyclone cover 31'. Meanwhile, the dust collecting container 39' is re-engaged with the cyclone cover 31' by rotating the dust collecting container 39' clockwise.

As explained above, the cyclone dust collecting device for a vacuum cleaner in accordance with the present invention, improves the cleaning efficiency of the vacuum cleaner, even when the orientation of the cyclone dust collecting device changes during operation. Furthermore, the device provides a safer way of emptying the contents of the dust collecting container, by preventing the dispersal of contaminants from grill and protecting the grill.

Although the preferred embodiment of the present invention has been described, it will be understood by those skilled in the art that the present invention should not be limited to the described preferred embodiment. Various changes and modifications can be made within the spirit and scope of the present invention, as defined by the appended claims.

What is claimed is:

1. A cyclone dust collecting device for a vacuum cleaner, comprising:

a cyclone body for connection to a telescopic extension pipe of the vacuum cleaner, the cyclone body generating a swirling vortex from an inflow of air and contaminants; and a cyclone housing detachably engaged with the cyclone body, the cyclone housing having a spiral partition dividing an interior of the cyclone housing into an upper space for separating the contaminants from the air by guiding the swirling vortex of air and a lower space for receiving the contaminants that have been separated from the air.

2. The cyclone dust collecting device as claimed in claim 1, wherein the cyclone housing comprises:

a cyclone cover having a cylindrical shape, an open upper end, and a lower slanted end, the open upper end being engaged with the cyclone body, the lower slanted end being slanted by the spiral partition; and a dust collecting container detachably engaged with a lower portion of the slanted end of the cyclone cover, the dust collecting container receiving the contaminants that have passed through the spiral partition.

3. The cyclone dust collecting device as claimed in claim 2, further comprising an engagement portion extending from the lower slanted end of the cyclone cover, the engagement portion engaging an open upper end of the dust collecting container to secure the dust collecting container thereto.

4. The cyclone dust collecting device as claimed in claim 1, wherein the spiral partition includes a dome-shaped protrusion formed on a center thereof.

5. The cyclone dust collecting device as claimed in claim 1, wherein the spiral partition has a first edge and a second edge, the first and second edges aligning in a vertical plane.

6. The cyclone dust collecting device as claimed in claim 1, wherein the spiral partition has a first end and a second end, the first and second ends overlapping each other in a vertical plane.

7. The cyclone dust collecting device as claimed in claim 1, further comprising supporting means for supporting the cyclone housing with respect to the telescopic extension pipe and preventing separation of the cyclone housing from the cyclone body.

8. The cyclone dust collecting device as claimed in claim 7, wherein the supporting means comprises:
   a fixture member mounted on the telescopic extension pipe;
   an insertion member movably disposed on the fixture member, the insertion member being received in a recess formed in a lower end of the cyclone housing, when the cyclone housing is coupled to the cyclone body; and
   an elastic member for biasing the insertion member into engagement with the recess.

9. The cyclone dust collecting device as claimed in claim 2, further comprising supporting means for elastically supporting the cyclone housing with respect to the telescopic extension pipe and preventing separation of the cyclone housing from the cyclone body.

10. The cyclone dust collecting device as claimed in claim 9, wherein the supporting means comprises:
    a fixture member mounted to the telescopic extension pipe;
    an insertion member movably disposed on the fixture member, the insertion member being received in a recess formed in a lower end of the cyclone housing, when the cyclone housing is coupled to the cyclone body; and
    an elastic member for biasing the insertion member into engagement with the recess.

11. The cyclone dust collecting device as claimed in claim 1, wherein the cyclone housing comprises:
    a cyclone cover having a cylindrical shape, an open upper end, and a lower slanted end, the open upper end being engaged with the cyclone body, the lower slanted end being slanted at a predetermined angle with respect to the spiral partition; and
    a dust collecting container having an open end engaged by a threaded connection with a lower portion defining the lower space, the dust collecting container receiving the contaminants that have passed through the spiral partition.

12. The cyclone dust collecting device as claimed in claim 1, wherein the cyclone body includes a grill, the grill defining an air suction path and an air exhaust path, and having a plurality of fine holes formed therein through which air flows.

13. A vacuum cleaner comprising:
    a cleaner body;
    a telescopic extension pipe coupled to the cleaner body via a flexible hose;
    a cyclone dust collecting device mounted to the telescopic extension pipe, the cyclone dust collecting device including:
        a cyclone body mounted on the telescopic extension pipe, the cyclone body generating a swirling vortex from an inflow of air and contaminants; and
        a cyclone housing detachably engaged with the cyclone body, the cyclone housing having a spiral partition dividing an interior of the cyclone housing into an upper space for separating the contaminants from the air and a lower space for receiving the contaminants that have been separated from the air.

14. The vacuum cleaner as claimed in claim 13, wherein the cyclone housing includes:
    a cyclone cover having a cylindrical shape, an open upper end, and a lower slanted end, the open upper end being engaged with the cyclone body, the lower slanted end being slanted by the spiral partition; and
    a dust collecting container detachably engaged with a lower portion of the slanted end of the cyclone cover, the dust collecting container receiving the contaminants that have passed through the spiral partition.

15. The vacuum cleaner as claimed in claim 14, further comprising an engagement portion extending from the lower slanted end of the cyclone cover, the engagement portion engaging an open upper end of the dust collecting container to secure the dust collecting container thereto.

16. The vacuum cleaner as claimed in claim 13, wherein the spiral partition includes a dome-shaped protrusion formed on a center portion thereof.

17. The vacuum cleaner as claimed in claim 13, wherein the spiral partition has a first edge and a second edge, the first and second edges aligning in a vertical plane.

18. The vacuum cleaner as claimed in claim 13, wherein the spiral partition has a first end and a second end, the first and second ends overlapping each other in a vertical plane.

19. The vacuum cleaner as claimed in claim 13, further comprising supporting means for supporting the cyclone housing with respect to the telescopic extension pipe and preventing separation of the cyclone housing from the cyclone body.

* * * * *